United States Patent
Adrian

[11] Patent Number: 6,116,628
[45] Date of Patent: Sep. 12, 2000

[54] MUD FLAP HOLDER APPARATUS

[76] Inventor: William E. Adrian, H.C.R. 78, Box 17, White River, S. Dak. 57579

[21] Appl. No.: 09/167,924

[22] Filed: Oct. 6, 1998

[51] Int. Cl.$^7$ .................................................. B62D 25/18
[52] U.S. Cl. ........................................ 280/154; 280/851
[58] Field of Search .................................. 280/847, 848, 280/154, 851

[56] References Cited

U.S. PATENT DOCUMENTS

| | | |
|---|---|---|
| 2,405,262 | 8/1946 | Lindsay . |
| 2,652,266 | 9/1953 | Miller . |
| 3,095,215 | 6/1963 | Black . |
| 3,158,386 | 11/1964 | Tillinghast ............................ 280/851 |
| 3,219,363 | 11/1965 | Dalsey ................................ 280/851 |
| 3,333,868 | 8/1967 | Sogoian ............................... 280/851 |
| 3,684,312 | 8/1972 | Evans . |
| 3,700,260 | 10/1972 | Moore et al. ......................... 280/851 |
| 3,746,366 | 7/1973 | Bruce et al. . |
| 3,778,086 | 12/1973 | Moore et al. . |
| 4,043,568 | 8/1977 | Hollon . |
| 4,189,165 | 2/1980 | Leonard et al. . |
| 4,323,262 | 4/1982 | Arenhold . |
| 4,326,727 | 4/1982 | Rock . |
| 4,627,594 | 12/1986 | Reed . |
| 4,726,599 | 2/1988 | Antekeier et al. . |
| 4,877,267 | 10/1989 | Leonard . |
| 4,923,215 | 5/1990 | Williams . |
| 4,960,294 | 10/1990 | Leonard . |
| 4,966,378 | 10/1990 | Cook . |
| 5,044,667 | 9/1991 | Manning .............................. 280/851 |
| 5,823,571 | 10/1998 | Cominsky ........................... 280/847 |
| 5,915,708 | 6/1999 | Silva .................................. 280/154 |
| 5,967,553 | 10/1999 | Cominsky ........................... 280/847 |

*Primary Examiner*—Paul N. Dickson
*Assistant Examiner*—Bridget Avery
*Attorney, Agent, or Firm*—Merchant & Gould P.C.

[57] ABSTRACT

A mud flap holder for mounting the on rear portion of a vehicle behind its rear wheels, wherein the mud flap is held between the back plate of the holder and a pivotally mounted jaw cover by spring loaded tension. The mud flap is inserted in the holder by first opening the jaw cover of the holder, for example with a lever, placing the flap between the jaw cover and back plate of the holder, and releasing the lever so that the jaw cover closes, securing the mud flap between the back plate and the jaw cover. In a preferred embodiment, the mud flap is not damaged if the flap is accidentally pulled out from the holder.

16 Claims, 4 Drawing Sheets

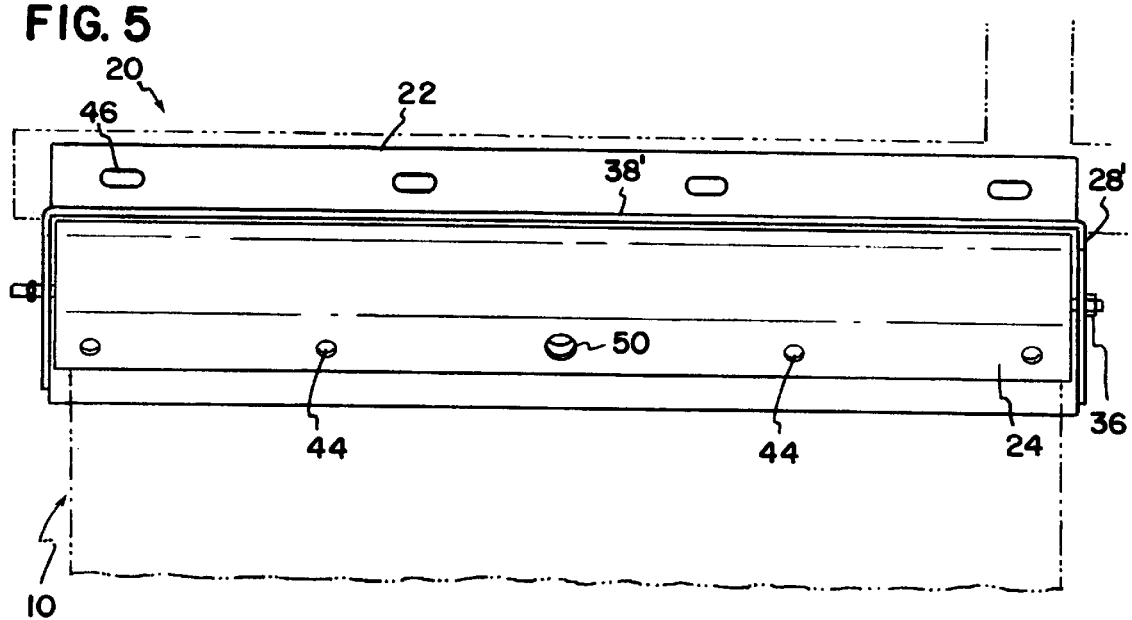

MUD FLAP HOLDER APPARATUS

FIELD OF THE INVENTION

The present invention relates to a holder mounted on the rear of a vehicle for securing a mud flap to the vehicle. In particular, the invention relates to a method of holding a mud flap on a vehicle by pressure and friction.

BACKGROUND OF THE INVENTION

Mud flaps have long been applied behind the wheels of vehicles to protect objects behind the vehicle from splashes of mud, water, and from rocks picked up from the road surface and thrown by the tires. Semi-truck trailers in particular are notorious for producing extensive water spray and rock damage to neighboring and following cars.

Mud flaps are typically mounted in a holder that is attached to the vehicle's chassis or some bracket or protective structure. In some designs (those typically used for passenger vehicles), the mud flap is bolted directly to the vehicle fender. Typically, no matter whether a passenger vehicle or a tractor-trailer, the flap is mounted to the holder by placing a fastener, such as a bolt, through a hole in the flap and securing the bolt to the holder. This design is simple, straightforward, and widely utilized. Other conventional designs for holding mud flaps include using U-shaped clamps, clips, and frictionally retaining the flap between a bracket and a plate compressed by fasteners such as bolts. Mud flaps with an increased top end diameter or thickness have been slid into and retained by elongate slots or gaps in holders.

In many designs, the flap is mounted so that it automatically releases itself from the holder if, for example, the flap is caught between the wheel and a stationary object, for example a loading dock or curb. With most mud flap holder designs, the flap is literally ripped out of the holder, typically at the point where the bolts are positioned or where the flap is held by the clamps or slot, thereby damaging the mud flap. Although the majority of the flap, once ripped from the holder, is reusable, usually either the holes in the flap must be repunched or the top edge of the flap must be recut, resulting in a shortening of the flap. Unfortunately, in some instances, and after many such mishaps, the flaps become completely torn and are no longer useable or salvageable. There have been several attempts to provide a mud flap holder that will release the flap when necessary without tearing or ripping the flap. However, none of these holders has been practical in the trucking industry.

Many communities have enacted laws and regulations requiring the use of mud flaps. In some locations these laws explicitly detail the size of the mud flap to be used, including the length and width. A semi-truck driver may end up switching the flaps on his rig several times on one trip depending on his route. Some conventional mud flap holders can be complicated and switching the flaps can be very time consuming and strenuous.

What is needed is a holder in which a flap can be quickly and easily replaced, without the need for special wrenches or other tools, which typically are not immediately assessable.

SUMMARY

The present invention is a new and improved holder for securing mud flaps to a vehicle. Rather than bolting the flap to a holder, the flap is held in the holder by a compressive force provided by a spring. Various mud flap holders and methods of using the mud flap holders to secure flaps are disclosed.

In particular a particular embodiment, the mud flap holder of the present invention comprises an elongated back plate and a jaw cover, the jaw cover in pivotal relation to the back plate, and a spring positioned between the back plate and the jaw cover, wherein the spring exerts pressure on the back plate and the jaw cover such that the top edge of the jaw cover is urged away from the back plate and the bottom edge of the jaw cover is urged toward the back plate at a pressure sufficient to hold a mud flap between the jaw cover and the back plate.

The present invention further includes a mud flap holder assembly comprising a mud flap and a holder, the holder having an elongated back plate and jaw cover in pivotal relation to the back plate to form a hinge and a spring positioned between the back plate and the jaw cover, wherein the spring exerts pressure on the back plate and the jaw cover such that the top edge of the jaw cover is urged away from the back plate and the bottom edge of the jaw cover is urged toward the back plate at a pressure sufficient to hold a mud flap between the jaw cover and the back plate.

BRIEF DESCRIPTION OF THE DRAWINGS

Referring to the Drawings, where like numerals represent like parts throughout the several views and throughout the application:

FIG. 5 is a front view of a mud flap holder according to another embodiment of the present invention, a mud flap being shown in broken lines;

DETAILED DESCRIPTION

Figure 1:
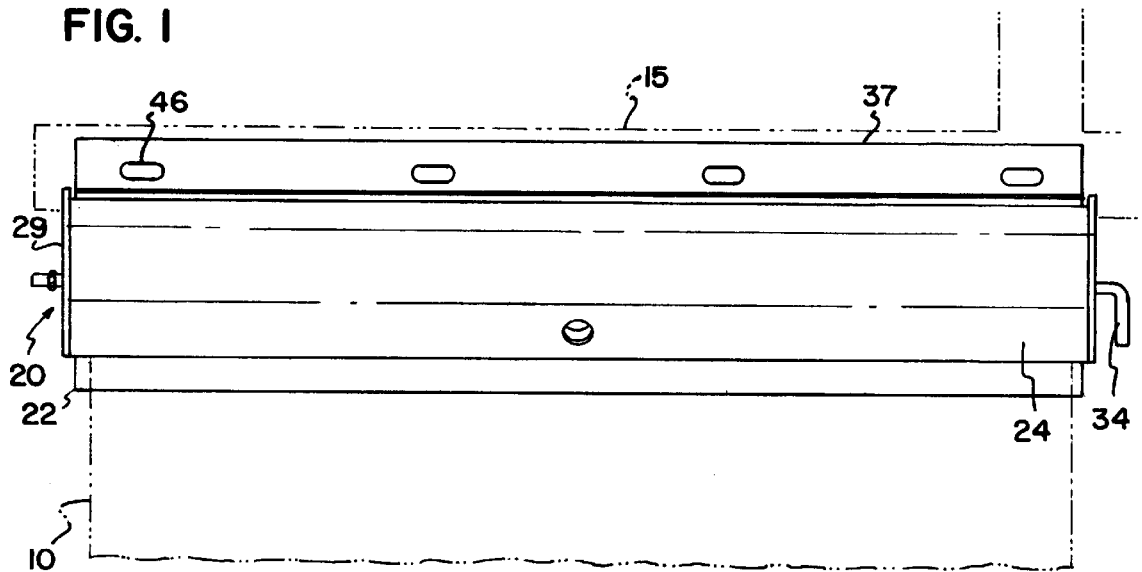
FIG. 1 is a front view of a mud flap holder according to one embodiment of the present invention, a mud flap being shown in broken lines.

The present invention is a new and improved mud flap holding system for securing mud flaps to a vehicle. In FIG. 1, a mud flap 10 (in dashed lines) is shown held by mud flap holder 20, which is mounted on structure 15 (in dashed lines) for example, a truck frame. Holder 20 has an elongate structure, typically longer than the width of mud flap 10. While the primary use of holder 20 is for securing a mud flap for semi-truck tractors and trailers, this holder 20, and versions thereof, could be used for other vehicles such as passenger vehicles, pick-up trucks, motor homes, trailers, and the like.

Figure 3:
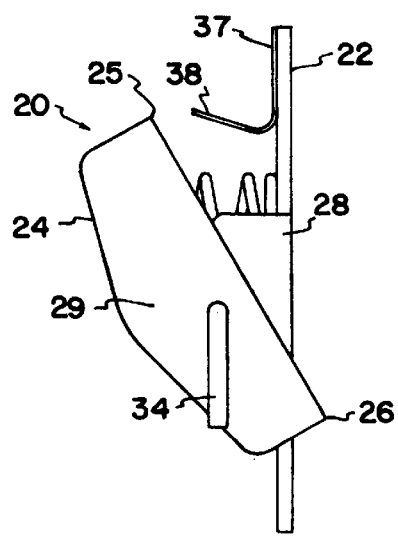
FIG. 3 is a side view of the mud flap holder as shown in FIG. 1, without a mud flap held thereby.
Figure 4:
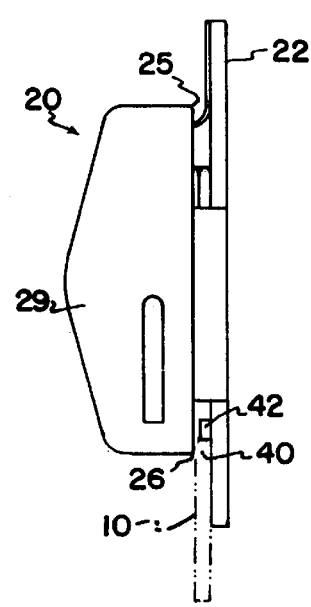
FIG. 4 is a side view of a mud flap holder as shown in FIG. 1, holding a mud flap (shown in broken lines) therein.
Figure 6:
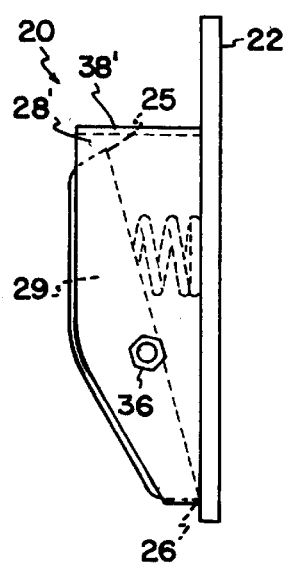
FIG. 6 is a side view of the mud flap holder as shown in FIG. 5, without a mud flap held thereby.
Figure 2:
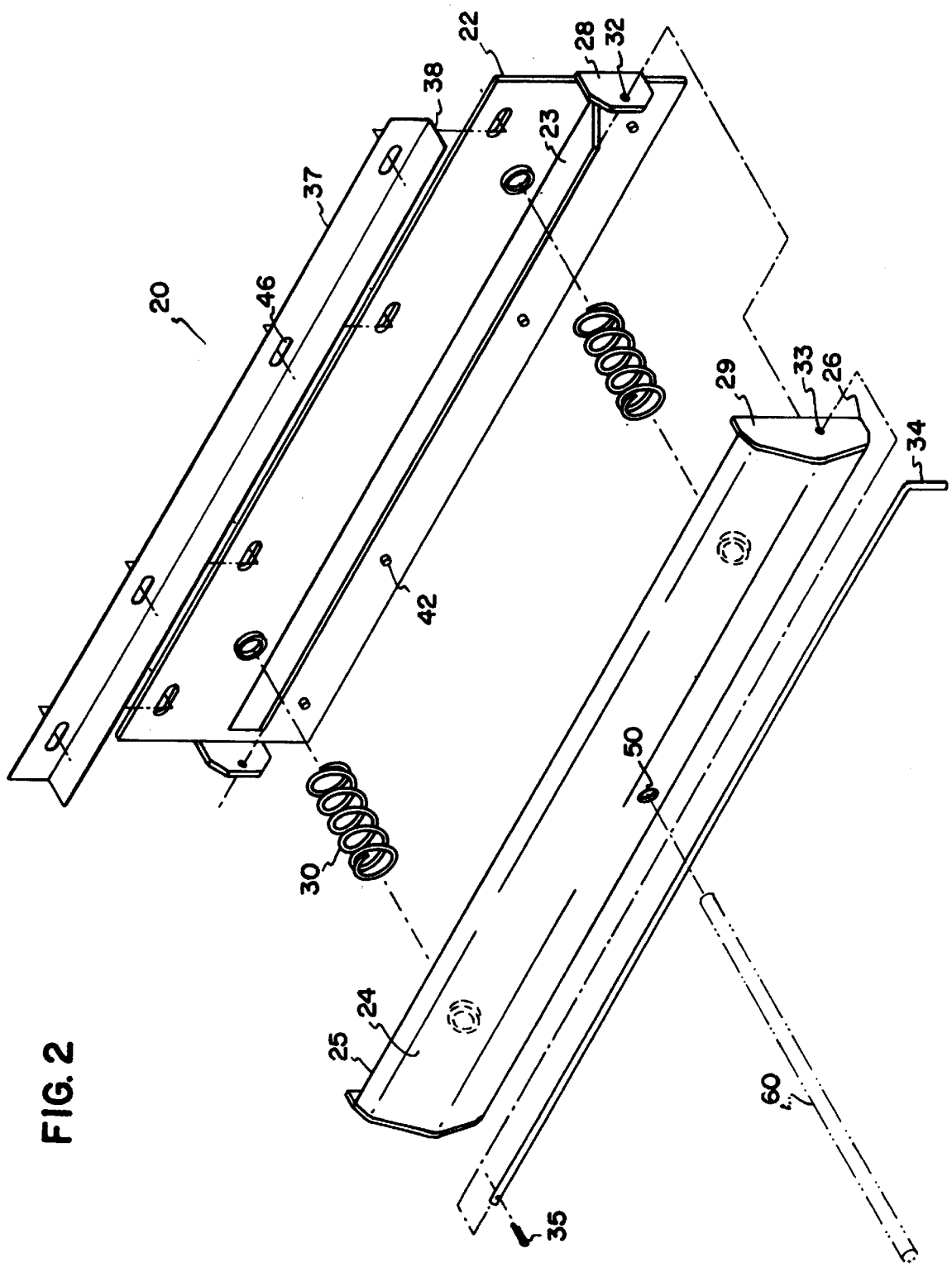
FIG. 2 is an exploded perspective view of the mud flap holder as shown in FIG. 1.

FIGS. 2, 3 and 4 show one embodiment of a mud flap holder 20 according to the present invention; FIG. 2 is a detailed, exploded view of the various parts of holder 20 of this embodiment. FIGS. 5 and 6 show another embodiment of a mud flap holder 20 according to the present invention. Holder 20 has a back plate 22 that generally extends the length of holder 20 and is the portion of holder adjacent to the truck. Back plate 22 can be considered the back or backside of the holder. Jaw cover or jaw plate 24, on the front side of holder 20, also generally extends the length of holder 20. Back plate 22 and jaw cover 24 are pivotally attached by a hinge so that jaw cover 24 can be moved in pivotal relation to back plate 22. Jaw cover 24 has a top edge 25 and a bottom edge 26. It is within space 40 between bottom edge 26 and back plate 22 that a mud flap is secured. The force or pressure needed to firmly secure the mud flap between bottom edge 26 and back plate 22 is provided by spring 30, located between jaw cover 24 and back plate 22.

In particular, back plate 22 is the back portion of holder 20 and typically is at least partially in contact with the vehicle's frame, chassis, or other bracket or mounting device that is connected to the frame or chassis. Back plate 22 is an elongate plate, preferably about 25 inches long, 6 inches wide and 3/16 inch thick, although other dimensions could be used depending on the type of vehicle for which holder 20 is designed. The length of the back plate 22 should be sufficient to extend the width of, and preferably about 1 inch more than, the width of a mud flap. Mud flaps are generally available at a width of 24 inches, however, wider and narrower flaps are often found.

Back plate 22 is a generally rigid, planar plate, typically made from metal, for example steel or iron. A reinforcing member bar or rod 23 may be located on, or integral with back plate 22 to provide torsional resistance against bending and twisting. This bar may be centrally located along the length of back plate 22 or may be located at a top or bottom edge or plate 22. FIG. 2 shows reinforcing member 23 centrally located, approximately located at the position of the hinge. Back plate 22 should be sufficiently strong to withstand any bumps, jarring, twisting or other actions it may encounter when mounted on a vehicle.

Close to the top of back plate 22 is positioned top ledge 38 to prevent rocks, dirt, and other debris from falling or settling into the holder 20. Ledge 38 may be located either below or above the top edge 25 of jaw cover 24 when holder 20 is retaining a mud flap. For example, FIG. 4 shows ledge 38 positioned under the top edge 25 of jaw cover 24. Alternately, FIG. 6 shows ledge 38' positioned above top edge 25 of jaw cover 24. Further, ledge 38' in FIG. 6 functions as a reinforcing member (23) to increase torsional resistance.

Jaw cover 24 is basically the front cover of holder 20. That is, it is located opposite back plate 22 and is generally farthest away from the vehicle frame or chassis. Jaw cover 24 is essentially the same length as back plate 22, however, depending on the exact design of holder 20, jaw cover 24 will likely be either shorter than or extend longer than back plate 22. For example, FIG. 1 shows jaw cover 24 extending slightly past the ends of back plate 22, whereas FIG. 5 shows jaw cover 24 shorter than back plate 22. Jaw cover 24 usually does not extend to cover the entire vertical width of back plate 22, but a portion of back plate 22 extends above and below jaw cover 24.

Jaw cover 24 may have a convex or angled surface when viewed from the front of holder 20, but is generally fairly flat so that decals such as light reflective tape can be adhered to the surface. Jaw cover 24 may be formed from a single piece of material, for example metal such as iron or steel, or jaw cover 24 may be several pieces joined together. Jaw cover 24 should be sufficiently strong and rigid to withstand bumps, twists and other motions it may encounter when mounted on a vehicle, without releasing the mud flaps. A jaw cover cap 29 may aid in providing rigidity to the jaw cover 24, and can be used to hold the jaw cover 24 to the back plate 22.

Jaw cover 24 is pivotally attached to back plate 22 preferably by a hinge extending the length of back plate 22 and jaw plate 24. The hinge is formed by pivotally joining bracket 28 located on back plate and jaw cover cap 29. The embodiment shown in FIGS. 1 through 4 has bracket 28 located inside the jaw cover cap 29. Alternately, the embodiment shown in FIGS. 5 and 6 has bracket 28' located external of the jaw cover cap (not illustrated). The embodiment of FIGS. 5 and 6 further has bracket 28' integral with top ledge 38'.

A hinge pin 34 or rod preferably extends the length of holder 20 and passes through hole 32 in bracket 28 and hole 33 in jaw cover cap 29 to form a hinge. Hinge pin 34 may be secured at its ends, for example by a bent portion (as best seen in FIG. 1), by nut 36 screwed onto hinge pin 34, or cotter pin 35. For strength and security reasons, it may be desirable to permanently weld nut 36 onto hinge pin 34.

Alternately, hinge pin 34 may not extend the length of holder 20 but may be only present at the hinge points between bracket 28 and jaw cover cap 29. In such a situation, multiple hinge pins would be used.

Bracket 28 is preferably located at the ends of back plate 22 in a vertical position, however, some designs may move bracket 28 inward toward the center of back plate 22 if bracket 28 is located inside jaw cover cap 29. Bracket 28 is typically adjacent to end cap 29 or other feature of jaw cover 24 so as to form a stable hinge. However, it may be feasible to design a holder 20 having a hinge with some spacing between bracket 28 and jaw cover cap 29. In a preferred embodiment, bracket 28' is integral with and perpendicular to top ledge 38'.

Spring 30, which provides the pressure to secure the mud flap, is positioned between back plate 22 and jaw cover 24 so that an end of the spring 30 is in contact with back plate 22 and another end of spring 30 is in contact with jaw cover 24. Preferably, two springs 30 are symmetrically positioned between back plate 22 and jaw cover 24. As best seen in FIGS. 3 and 6, spring 30 is positioned above the hinge axis, so that top edge 25 of jaw cover 24 is urged away from back plate 22 and bottom edge 26 is urged against back plate 22. FIGS. 2, 3 and 6 show spring 30 with its central axis positioned perpendicular to back plate 22 and generally perpendicular to jaw cover 24. It is the compressive force of spring 30 that urges jaw cover 24. In another embodiment, spring 30 may be positioned so that the central axis of spring 30 is essentially parallel to back plate 22. In such an embodiment, one end of the spring is in contact with the back plate 22 and the other end of the spring is in contact with jaw cover 24, and it is torsional forces from spring 30 that urge jaw cover 24. Preferably, spring 30 (or multiple springs 30) provide a force of approximately 70 pounds across the width of the jaw cover 24 to firmly secure the mud flap in the holder 20. A 2 inch long steel spring with a 1½ inch coil diameter is capable of providing sufficient holding force. If needed, the force can be increased by slightly compressing the spring, for example by inserting a ⅛ inch washer between the back plate 22 and spring 30.

To insert a mud flap into holder 20, spring 30 is compressed, thereby lifting bottom edge 26 away from back plate 22 and creating a space 40 (illustrated in FIG. 4) for insertion of mud flap 10. Preferably, bottom edge 26 of jaw cover 24 is lifted by inserting a lever 60 into a slot or hole 50 in jaw cover 24 (illustrated in FIG. 2) and exerting force on lever 60. The lever 60 used to open the jaw cover 24 can be any lever or like object typically found in a vehicle, for example, a tire iron or a wrench, or may be a specially designed lever.

To firmly secure mud flap 10 into holder 20, a mud flap is inserted into space 40 and the force compressing spring 30 is released, so that bottom edge 26 is urged toward back plate 22 and mud flap 10. Holder 20 holding a mud flap 10 (in dashed lines) is shown in FIGS. 1, 4 and 5.

In one embodiment, back plate 22 may have protrusions 42 thereon that help to line up a mud flap to be held by holder 20. For example, protrusions 42 are designed to align with holes or indents in the mud flap so that the flap is squarely positioned in holder. Protrusion 42 does not function as a bolt or screw securing the mud flap to the holder; protrusion 42 is designed for flap alignment, however the security of the flap in the holder 20 may be improved by protrusion 42. Preferably, protrusion 42 is less than half the thickness of the mud flap being held. In another embodiment, the mud flap may have a protrusion thereon that aligns with an indent in back plate 22. In a further embodiment, jaw cover 24 may have site holes 44 such as shown in FIG. 5 for visual alignment of the mud flap. Site holes 44 preferably are located above protrusions 42 or any indents.

Holder 20 may be attached directly to the trailer frame or to a bracket mounted on the frame. Typically, if the holder 20 is mounted on the tractor (that is, directly behind the drive wheels), holder 20 is mounted on a bracket that extends across the width of the tractor and is conventionally found on most tractors.

Holder 20 is typically bolted on to the vehicle or frame, generally by bracket 37 that has holes 46 there through. In a preferred embodiment, as shown in FIGS. 5 and 6, bracket 37 is integral with back plate 22 so that there is no specific bracket piece, but holes 46 pass directly through back plate 22. Holes 46 are positioned so that holder 20 can be mounted without requiring any modification from previous methods of mounting prior art flap holders to vehicles.

Figure 7:
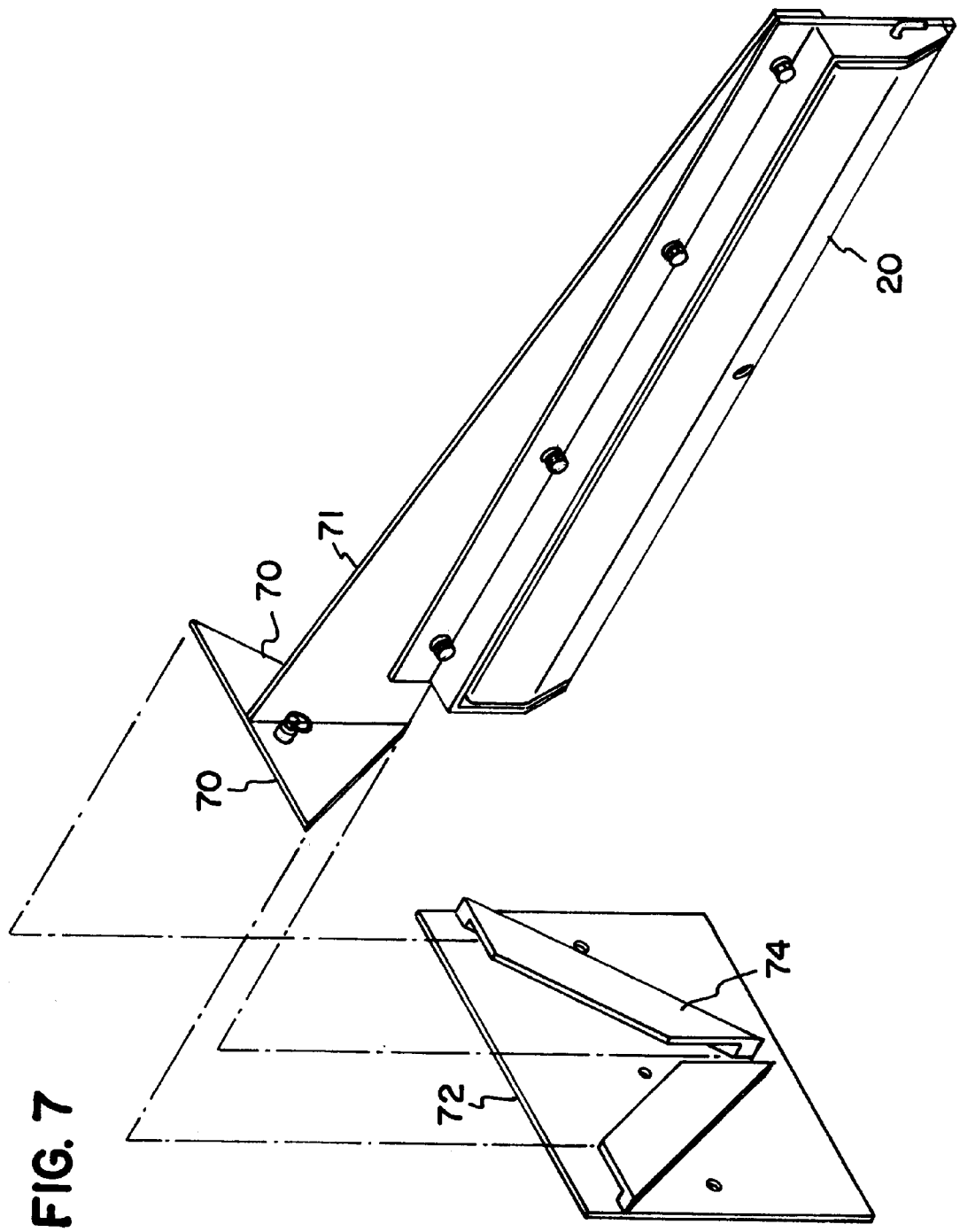
FIG. 7 is a perspective view of a mounting system including a bracket for mounting a mud flap holder to a vehicle.

Another preferred assembly for mounting holder 20 onto a vehicle includes a V-bracket such as shown in FIG. 7. In such an embodiment, a V-bracket 70 is mounted generally perpendicular to an end of holder 20. Holder 20 is attached to a lower edge of arm plate 71 by some means such as bolts or welding. V-bracket 70 is attached on an extended portion of arm plate 71 by some means such as welding. V-bracket 70 is designed to correspond to a bracket accepting means 74 that is mounted on or integral with a frame structure 72 of the vehicle. As shown in FIG. 7, bracket accepting means 74 comprises two lipped protrusions, which, when the V-bracket is slid therein, securely holds V-bracket 70. Bracket accepting means 74 many be integral with frame structure 72, that is, welded directly onto the frame structure, or bracket accepting means 74 may be integral with a plate (not shown), which is then attached to the frame structure, typically by bolts. V-bracket 70, arm plate 71 and bracket accepting means 74 should be sufficiently strong and rigid to maintain holder 20 in an essentially horizontal position.

Holder 20, having V-bracket 70 on the end, is mounted onto the vehicle by simply placing V-bracket 70 into bracket accepting means 74. The shape of V-bracket 70 securely retains holder 20 and allows easy access to the mud flaps, and allows easy removal of holder 20 from the vehicle when necessary. The design of bracket accepting means 74 provides adequate retention of the holder 20 on the vehicle, but if necessary, a locking or retention mechanism may be added to further secure V-bracket 70 into the accepting means 74, to ensure that V-bracket 70 does not inadvertently dislodge due to excessive bumping or jarring.

The foregoing description, which has been disclosed by way of the above examples and discussion, addresses embodiments of the present invention encompassing the principles of the present invention. The embodiments may be changed, modified and/or implemented using various types of arrangements. Those skilled in the art will readily recognize various modifications and changes which may be made to the present invention without strictly following the exemplary embodiments and applications illustrated and described herein, and without departing from the scope of the present invention which is set forth in the following claims.

I claim:

1. A mud flap holder, comprising:
   (a) an elongated back plate having a first end, a second end, and a length between the ends, the back plate comprising a first bracket and a second bracket;
   (b) a jaw cover having a first end, a second end, a length between the ends, a top edge and a bottom edge, the jaw cover in pivotal relation to the back plate to form a hinge at each of the first bracket and the second bracket; and
   (c) a first spring positioned between the back plate and the jaw cover, wherein the spring exerts pressure on the back plate and the jaw plate such that the top edge is urged away from the back plate and the bottom edge is urged toward the back plate at a pressure sufficient to hold a mud flap between the jaw cover and the back plate.

2. The mud flap holder according to claim 1, wherein the first bracket is positioned at the first end of the back plate and the second bracket is positioned at the second end of the back plate.

3. The mud flap holder according to claim 2, wherein the first end of the jaw cover has a first cap thereover and the second end of the jaw cover has a second cap thereover.

4. The mud flap holder according to claim 2, further comprising a ledge positioned on and extending the length of the back plate, the ledge integral with the first bracket and the second bracket.

5. The mud flap holder according to claim 1, wherein the length of the jaw cover is less than the length of the back plate.

6. The mud flap holder according to claim 1, wherein the length of the jaw cover is greater than the length of the back plate.

7. The mud flap holder according to claim 1, further comprising a second spring, the first and second springs being symmetrically spaced along the length of the back plate.

8. The mud flap holder according to claim 7, wherein the first and second springs provide a force of approximately 70 pounds.

9. The mud flap holder according to claim 1, wherein the back plate has a first protrusion thereon, the protrusion adapted and configured to correspond to an indent in the mud flap.

10. The mud flap holder according to claim 9, further comprising a second protrusion.

11. The mud flap holder according to claim 1, wherein the back plate has a first indent therein, the indent adapted and configured to correspond to a protrusion in the mud flap.

12. The mud flap holder according to claim 11, further comprising a second indent.

13. The mud flap holder according to claim 1, the jaw cover having a hole therein adapted for pivotally moving the jaw cover.

14. A mud flap assembly comprising:
   (a) a mud flap holder comprising:
      (i) an elongated back plate having a first end, a second end, and a length between the ends, the back plate comprising a first bracket and a second bracket;

(ii) a jaw cover having a first end, a second end, a length between the ends, a top edge and a bottom edge, the jaw cover in pivotal relation to the back plate to form a hinge at each of the first bracket and the second bracket; and (iii) a first spring positioned between the back plate and the jaw cover, wherein the spring exerts pressure on the back plate and the jaw plate such that the top edge is urged away from the back plate and the bottom edge is urged toward the back plate at a pressure sufficient to hold a mud flap between the jaw cover and the back plate; and (b) a mud flap.

15. A mud flap holder assembly comprising:

(a) a mud flap holder comprising:
   (i) an elongated back plate having a first end, a second end, and a length between the ends, the back plate comprising a first bracket and a second bracket;
   (ii) a jaw cover having a first end, a second end, a length between the ends, a top edge and a bottom edge, the jaw cover in pivotal relation to the back plate to form a hinge at each of the first bracket and the second bracket; and
   (iii) a first spring positioned between the back plate and the jaw cover, wherein the spring exerts pressure on the back plate and the jaw plate such that the top edge is urged away from the back plate and the bottom edge is urged toward the back plate at a pressure sufficient to hold a mud flap between the jaw cover and the back plate; and (b) a lever.

16. The mud flap holder assembly according to claim 15, wherein the lever is configured and adapted for insertion in a hole in the jaw cover.

* * * * *